Patented Aug. 27, 1946

2,406,609

UNITED STATES PATENT OFFICE 2,406,609

COATING COMPOSITIONS

Leonard M. Kebrich and Edwin P. Peterson, Brooklyn, N. Y., assignors to National Lead Company, New York, N. Y., a corporation of New Jersey No Drawing. Application July 14, 1943, Serial No. 494,894

5 Claims. (Cl. 106—256)

The present invention relates to paint compositions containing metallic salts of hydroxy aromatic acids and their derivatives and more particularly to paint compositions containing metallic salts of hydroxy benzoic acids, such as lead salicylate.

The principal object of this invention is to offer paint coatings of improved durability and weathering properties, particularly in respect to prolonged film integrity and retarded film breakdown, when exposed to the weather. Other objects of the invention will become apparent as the description thereof proceeds.

In a copending application of Leonard M. Kebrich, one of the inventors herein, Serial No. 462,769, filed October 20, 1942, several lead salts of salicylic acid are described as well as a new process for making such compounds. Of the lead salts of salicylic acid therein disclosed, the normal and monobasic salts are generally preferable to the pentabasic salt for use in the present invention, although in certain cases the pentabasic salt may be advantageously employed. However, it is to be understood that the present invention is not to be limited either to the lead salicylates or to the manner of preparing such salicylates disclosed in the aforesaid application.

In accordance with the present invention, it has been found that metal salts of hydroxy aromatic acids in general and particularly metal salts of salicylic acid confer unusual exterior durability when used to pigment common paint vehicles, varnishes, paint oils and synthetic resins. The exceptional durability of these coating compositions manifests itself in superior gloss retention, chalking resistance and tint retention. The use of a metal salt of a hydroxy aromatic acid in combination with other pigments also results in coating compositions having much greater durability than similar coating compositions which do not contain such metal salts. Generally the degree of improvement is proportional to the amount of metal salt used.

For convenience of expression and clarity of understanding, the present invention will be particularly described as regards the use of lead salicylates as a pigment constituent of paint coating compositions. However, it is to be understood that metal salicylates other than lead salicylates and metal salts of hydroxy aromatic acids other than the salicylates also greatly improve the durability of coating compositions, as evidenced by the examples hereinafter set forth showing the use of a basic zinc salicylate and a lead salt of 3-5-diiodohydroxy benzoic acid. The use of zinc salicylate is more particularly described in our copending application, Serial No. 631,790, filed November 29, 1945. Furthermore, representative salts of other organic acids that have been found to be of particular value are those of acetyl salicylic acid, 3-5-diiodohydroxy benzoic acid and 2-naphthol, 6-sulfonic acid. It is interesting also to note that certain halogenated aromatic acids also show considerable improvement in retarding film disintegration when used in a similar manner in paint coating compositions and an example of such a salt is the dibasic lead salt of orthochlorobenzoic acid.

The preparation of various coating compositions according to the present invention is specifically described in the examples presented below. In all these examples the term "basic lead salicylate" is intended to designate the lead salt in which the monobasic lead salicylate predominates. Also presented below will be found various tables which clearly show the improved durability and weathering properties of the coating compositions of the present invention.

EXAMPLE 1

This example embraces a series of exterior linseed oil paints prepared with lead salicylate as well as with various combinations of lead salicylate with white lead. The white lead control pigment was a Carter process basic lead carbonate and the composition by weight of the paint made from this pigment was as follows:

|  | Per cent |
|---|---|
| White lead | 71.6 |
| Linseed oil | 25.6 |
| Drier | .8 |
| Mineral spirits | 2.0 |
|  | 100.0 |

The paints of the present invention were prepared with progressively increasing amounts of lead salicylate by replacing the white lead pigment in the control paint formula with an equivalent amount of lead salicylate. This was done with both normal and the monobasic lead salicylates, resulting in paints having the following pigment compositions:

| Test paint number | Pigment |
|---|---|
| 1 (control) | 100% white lead. |
| 2 | 99% white lead, 1% normal lead salicylate. |
| 3 | 95% white lead, 5% normal lead salicylate. |
| 4 | 90% white lead, 10% normal lead salicylate. |
| 5 | No white lead, 100% normal lead salicylate. |
| 6 | 99% white lead, 1% basic lead salicylate. |
| 7 | 95% white lead, 5% basic lead salicylate. |
| 8 | 90% white lead, 10% basic lead salicylate. |
| 9 | No white lead, 100% basic lead salicylate. |

The above paints were employed as finish coats over a similar, single priming coat on duplicate cedar panels exposed at Miami, Florida, on 45° southern exposure test fences. Weekly inspections were made on the panels and the relative failure graded according to the following standards:

S=Slight
C=Considerable
B=Bad
V=Very
( )=Less than

The results of these chalking tests were as follows:

TABLE I.—CHALKING

| Test paint number | Exposure in weeks | | | | | | | | |
|---|---|---|---|---|---|---|---|---|---|
| | 8 | 12 | 16 | 20 | 24 | 28 | 32 | 36 | 40 |
| 1 (control) | S | B | VB | VB | VVB | VVB | VVB | VVB | VVB |
| 2 | (S) | (S) | S | C | C | VB | VB | VB | VB |
| 3 | | | | | | S | C | VB | VB |
| 4 | | | | | | | S | C | B |
| 5 | | | | | | | | None | |
| 6 | (S) | (S) | S | C | B | VB | VB | VVB | VVB |
| 7 | | | | | | S | B | VB | VVB |
| 8 | | | | | | | C | B | VB |
| 9 | | | | | | | | | (S) |

The improved results attained by the practice of the present invention are further illustrated in the following table which sets forth the period of time during which the respective paint films remained chalk-free:

TABLE II.—CHALK-FREE TIME

| Test paint number | Time in weeks | Increase over white lead |
|---|---|---|
| | | Per cent |
| 1 (control) | 6 | |
| 2 | 7 | 16 |
| 3 | 25 | 317 |
| 4 | 28 | 367 |
| 5 | 40 | 667 |
| 6 | 6 | 0 |
| 7 | 24 | 300 |
| 8 | 25 | 317 |
| 9 | 37 | 517 |

Some of the white lead test paints used in the above Example 1 were also tested for their durability in gray tints, the test paints being brought to the same shade of gray by the addition of small amounts of lampblack. They were then painted as finish coats in a manner similar to those described in Example 1 and graded in a similar manner to Example 1. Results of these tests were as follows:

TABLE III.—TINT RETENTION (*Fading in gray paints*)

| Test paint number | 10 | 15 | 20 | 25 | 30 | 35 | 40 |
|---|---|---|---|---|---|---|---|
| 1 | C | B | VB | VB | VB | VVB | VVB |
| 4 | (S) | S | C | C | C | C | B |
| 8 | S | S | C | C | B | B | B |

EXAMPLE 2

This example embraces a series of exterior linseed oil paints prepared with lead salicylates in combination with various pigments. The performance of said paints was compared with the performance of control paints similarly prepared and pigmented but which did not contain lead salicylate. The respective control paints were formulated according to the following compositions:

| Pigment | A | B | C |
|---|---|---|---|
| | Per cent | Per cent | Per cent |
| White lead | 100 | 60 | 50 |
| Titanium barium pigment | | | 30 |
| Zinc oxide | | 30 | 20 |
| Magnesium silicate | | 10 | |
| | 100 | 100 | 100 |

| Vehicle | A | B | C |
|---|---|---|---|
| | Per cent | Per cent | Per cent |
| Linseed oil | 90 | 90 | 90 |
| Mineral spirits | 7 | 7 | 7 |
| Drier | 3 | 3 | 3 |
| | 100 | 100 | 100 |

| Composition of paint | A | B | C |
|---|---|---|---|
| | Per cent | Per cent | Per cent |
| Pigment | 72.6 | 67.9 | 67.6 |
| Vehicle | 27.4 | 32.1 | 32.4 |
| | 100.0 | 100.0 | 100.0 |

Six test paints were then prepared according to the present invention. Of these six paints, two were similar to control paint A, two to control paint B and two to control paint C except that in each case a part of the pigment of the respective control paints was replaced with an equal amount of normal lead salicylate or basic lead salicylate to give the following pigment compositions:

| Test paint number | Pigment |
|---|---|
| 10 (control) | 100% pigment composition A. |
| 11 | 90% pigment composition A, 10% normal lead salicylate. |
| 12 | 90% pigment composition A, 10% basic lead salicylate. |
| 13 (control) | 100% pigment composition B. |
| 14 | 90% pigment composition B, 10% normal lead salicylate. |
| 15 | 90% pigment composition B, 10% basic lead salicylate. |
| 16 (control) | 100% pigment composition C. |
| 17 | 90% pigment composition C, 10% normal lead salicylate. |
| 18 | 90% pigment composition C, 10% basic lead salicylate. |

The foregoing paints were employed as finish coats over a similar, single priming coat on duplicate cedar panels exposed at Miami, Florida, in 45° southern exposure test fences. Weekly inspections were made and the following results were obtained for chalking, the symbols being the same as those described in connection with Example 1:

TABLE IV.—CHALKING

| Test paint number | Exposure in weeks | | | | | | |
|---|---|---|---|---|---|---|---|
| | 6 | 8 | 10 | 12 | 14 | 16 | 18 |
| 10 (control) | (S) | C | B | VB | VB | VB | VB |
| 11 | None | | | | | | |
| 12 | None | | | | | | |
| 13 (control) | | | | (S) | C | C | B |
| 14 | | | | | | | S |
| 15 | | | | | | | S |
| 16 (control) | (S) | (S) | S | S | C | B | B |
| 17 | | | | (S) | S | S | S |
| 18 | | | | | (S) | S | C |

It has also been found that by virtue of the present invention it is possible to improve the durability of solid color paints pigmented predominately with color or black pigments. When such paints, generally called trim paints, lose their gloss or chalk, they show fading and a corresponding loss of color value. To illustrate this phase of the present invention, the following example is presented:

EXAMPLE 3

Typical trim paints were prepared from heat bodied linseed oil and the following colors: Lampblack, Medium Chrome yellow, Prussian blue, Indian red and Toluidine red.

A similar group of paints was prepared from the above colors by extending them with blanc fixe. For this purpose the colored pigment component was reduced to 60% of its original amount and extended with 4 pounds of blanc fixe per gallon. A third group of paints was prepared in exactly similar fashion except that all the blanc fixe was replaced with an equal volume of normal lead salicylate. Neither the blanc fixe nor the normal lead salicylate in the above paints appreciably effected the original color tone.

The foregoing trim paints were exposed on vertical panels at Sayville, Long Island for 9 months and then observations were made on gloss retention, and resistance to fading. The results of such tests are set forth in Table V below wherein the paints are rated for degree of gloss and fading on the basis of a scale, 100 to 0. In this scale 100 represents the degree of gloss or the original color exhibited by the paint before exposure and 0 represents a total loss of gloss or color.

TABLE V.—SOLID COLORS—CONDITION AFTER NINE MONTHS EXPOSURE (a) Gloss

| | Straight color | Color and blanc fixe | Color and normal lead salicylate |
|---|---|---|---|
| Lampblack | 43 | 0 | 100 |
| Medium chrome yellow | 57 | 14 | 100 |
| Prussian blue | 28 | 0 | 100 |
| Indian red | 0 | 0 | 100 |
| Toluidine red | 43 | 0 | 100 |

(b) Fading

| | Straight color | Color and blanc fixe | Color and normal lead salicylate |
|---|---|---|---|
| Lampblack | 80 | 70 | 100 |
| Medium chrome yellow | 100 | 100 | 100 |
| Prussian blue | 70 | 60 | 100 |
| Indian red | 40 | 40 | 100 |
| Toluidine red | 90 | 70 | 100 |

It was further found that the index of refraction of normal lead salicylate approximates that of linseed oil and that when normal lead salicylate is the only pigment present in the coating composition, there were obtained transparent films similar to those of clear varnishes. Thus, by the addition of normal lead salicylate, it is possible to improve the durability of varnishes and clear coatings. In the following example heat bodied linseed oil was pigmented with normal lead salicylate and tested for weather durability.

EXAMPLE 4

A heat bodied linseed oil of viscosity Z-2 was successively pigmented with increasing amounts of normal lead salicylate to give the following compositions:

(a) 100% heat bodied linseed oil
(b) 89% heat bodied linseed oil, 11% normal lead salicylate
(c) 63% heat bodied linseed oil, 37% normal lead salicylate After the addition of suitable amounts of volatile thinner and drier these compositions were tested in the same manner as clear varnishes. Three coats of each of the above compositions were respectively applied to similar maple panels exposed at 45° southern exposure at Sayville, New York. After 33 weeks exposure the condition of the panel was as follows:

(a) Film destroyed, panel blackened, considerable mildew
(b) Good gloss, film intact, slight mildew
(c) High gloss, film intact, no mildew The above results serve to show the marked improvement in weatherability gained by the addition of normal lead salicylate to clear varnishes. Furthermore, it is evident that, if used in sufficient amounts, lead salicylate is an effective mildewcide.

The addition of lead salts of salicylic acids also served greatly to improve the weathering properties of enamels formulated with a synthetic resin vehicle according to the following example:

EXAMPLE 5

| | Per cent |
|---|---|
| Pigment: Titanium dioxide | 100 |
| Vehicle: | |
| Alkyd resin solution (70% solids) | 80.6 |
| Mineral spirits | 17.1 |
| Drier | 2.3 |
| | 100.0 |

Other enamels were also made up by substituting, on a volume basis, normal and basic lead salicylate for part of the titanium dioxide pigment of the above formulation, so that there were obtained the following compositions:

19. 100% titanium dioxide (control)
20. 80% titanium dioxide, 20% normal lead salicylate
21. 80% titanium dioxide, 20% basic lead salicylate Results of chalking tests on the above pigments, using the same grading as used in Table I, are given in Table VI below:

TABLE VI.—CHALKING

| Test paint number | Exposure in weeks | | |
|---|---|---|---|
| | 5 | 8 | 10 |
| 19 (control) | C | VB | VB |
| 20 | S | B | B |
| 21 | S | B | B |

The paints listed in the above Table VI were tested on duplicate cedar panels exposed at Miami, Florida, on 45° southern exposure fences.

While lead salicylate has been selected as a representative agent for describing the present invention, it is to be understood that other metal salicylates as well as other hydroxy aromatic acids will accomplish comparable results. The following example will serve to illustrate this fact:

EXAMPLE 6

The following control paint was prepared:

|  | Per cent |
|---|---|
| Basic carbonate white lead | 71.0 |
| Linseed oil | 24.8 |
| Mineral spirits and drier | 4.2 |

Test paints were also prepared in which 13.5% of the white lead in the control paint formula was respectively replaced with an equal volume of normal lead salicylate, lead salt of 3-5-diiodohydroxy benzoic acid and basic zinc salicylate as follows:

| Test paint number | |
|---|---|
| 22 | Control paint as described above. |
| 23 | 13.5% normal lead salicylate substituted for equal volume of white lead. |
| 24 | 13.5% lead salt of 3-5-diiodohydroxy benzoic acid substituted for equal volume of white lead. |
| 25 | 13.5% basic zinc salicylate substituted for equal volume of white lead. |

These paints were then painted out on small wood panels and exposed in an accelerated weathering machine (Atlas Weather-O-Meter). Gloss readings (60° specular) were made on the panels at regular intervals, with the following results:

TABLE VII.—GLOSS

| Test paint number | Original | 135 hours | 582 hours |
|---|---|---|---|
| 22 (control) | 69.5 | Flat | Flat |
| 23 | 79.5 | 43.0 | 7.0 |
| 24 | 74.5 | 50.0 | 13.5 |
| 25 | 75.0 | 63.5 | 45.5 |

The foregoing description with accompanying examples and tables clearly discloses a number of embodiments of the present invention. However, it will be understood that this invention is susceptible of further various embodiments within the scope of the appended claims.

Having thus described the invention, we claim the following:

1. An improved vegetable drying oil coating composition containing a lead salt of a hydroxy aromatic acid.

2. An improved vegetable drying oil coating composition containing a lead salt of a hydroxy benzoic acid.

3. An improved vegetable drying oil coating composition containing a lead salt of salicylic acid.

4. An improved vegetable drying oil coating composition containing a normal lead salt of salicylic acid.

5. An improved vegetable drying oil coating composition containing a basic lead salt of salicylic acid.

LEONARD M. KEBRICH.
EDWIN P. PETERSON.